US008927098B2

(12) United States Patent
Jung et al.

(10) Patent No.: US 8,927,098 B2
(45) Date of Patent: Jan. 6, 2015

(54) HARD COATING FILM

(71) Applicant: LG Chem, Ltd., Seoul (KR)

(72) Inventors: Soon-Hwa Jung, Daejeon (KR); Heon Kim, Daejeon (KR); Yeong-Rae Chang, Daejeon (KR); Hye-Min Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/020,358

(22) Filed: Sep. 6, 2013

(65) Prior Publication Data
US 2014/0079937 A1   Mar. 20, 2014

Related U.S. Application Data

(63) Continuation of application No. PCT/KR2013/004605, filed on May 27, 2013.

(30) Foreign Application Priority Data

| May 25, 2012 | (KR) | 10-2012-0056284 |
| May 25, 2012 | (KR) | 10-2012-0056285 |
| May 25, 2012 | (KR) | 10-2012-0056286 |
| May 25, 2012 | (KR) | 10-2012-0056287 |
| May 27, 2013 | (KR) | 10-2013-0059517 |

(51) Int. Cl.
| C09D 105/16 | (2006.01) |
| C08B 37/16 | (2006.01) |
| C08G 83/00 | (2006.01) |
| C08G 63/08 | (2006.01) |
| C08L 83/04 | (2006.01) |
| C08G 18/71 | (2006.01) |
| C08G 18/81 | (2006.01) |
| C09D 175/04 | (2006.01) |
| C09D 175/14 | (2006.01) |
| C09D 175/16 | (2006.01) |
| C08G 18/42 | (2006.01) |
| C08J 7/04 | (2006.01) |

(52) U.S. Cl.
CPC ....... *C09D 105/16* (2013.01); *C08B 37/0012* (2013.01); *C08B 37/0015* (2013.01); *C08G 83/007* (2013.01); *C08G 63/08* (2013.01); *C08L 83/04* (2013.01); *C08G 18/71* (2013.01); *C08G 18/8116* (2013.01); *C09D 175/04* (2013.01); *C09D 175/14* (2013.01); *C09D 175/16* (2013.01); *C08G 18/4277* (2013.01); *C08J 7/047* (2013.01); *C08J 2333/12* (2013.01)
USPC .......... 428/220; 428/480; 428/500; 428/323; 525/54.23

(58) Field of Classification Search
CPC .. C09D 167/04; C09D 133/08; C09D 133/12; C09D 105/16; C08G 63/08; C08J 7/047; B32B 7/02
USPC ................ 428/220, 480, 500, 323; 525/54.23
See application file for complete search history.

(56) References Cited

U.S. PATENT DOCUMENTS

| 7,799,867 B2 * | 9/2010 | Ito et al. ................. 525/54.4 |
| 2009/0214871 A1 * | 8/2009 | Fukuda et al. ............ 428/413 |

(Continued)

FOREIGN PATENT DOCUMENTS

| CN | 102046662 A | 5/2011 |
| JP | 2008-310286 A | 12/2008 |

(Continued)

OTHER PUBLICATIONS

Machine Translation of JP 2011-046917. Retrieved Apr. 1, 2014.*

(Continued)

*Primary Examiner* — Prashant J Khatri
(74) *Attorney, Agent, or Firm* — Rothwell, Figg, Ernst & Manbeck, P.C.

(57) ABSTRACT

The present invention relates to a hard coating film including a hard coating layer comprising: a crosslinked product of (a) a polyrotaxane compound including a macrocycle to which a lactone-based compound is bonded, wherein a (meth)acrylate-based compound is introduced at the end of the lactone-based compound at a ratio of 40 mol % to 70 mol %, a linear molecule penetrating the macrocycle, and blocking groups arranged at both ends of the linear molecule and preventing the macrocycle from escaping; and (b) a binder resin.

16 Claims, 3 Drawing Sheets

(56) References Cited

U.S. PATENT DOCUMENTS

2009/0312490 A1* 12/2009 Ito et al. .................... 525/54.2
2011/0105688 A1* 5/2011 Ruslim et al. .............. 525/54.26

FOREIGN PATENT DOCUMENTS

| JP | 2009-204725 A | 9/2009 |
| JP | 2011-046917 A | 3/2011 |
| JP | 2011-178931 A | 9/2011 |
| KR | 10-2007-0000473 A | 1/2007 |
| KR | 10-2011-0119704 A | 11/2011 |
| WO | 2011105532 A1 | 9/2011 |

OTHER PUBLICATIONS

Search Report issued in Internaional Appln. No. PCT/KR2013/004605 on Sep. 26, 2013, 2 pages.

International Search Report issued in International Application No. PCT/KR2013/004604 on Aug. 8, 2013, 3 pages.

* cited by examiner

//HARD COATING FILM

CROSS REFERENCE TO RELATED APPLICATIONS

The present application is a continuation of International Application No. PCT/KR2013/004605 filed on May 27, 2013, which claims priority to and the benefit of Korean Patent Application No. 10-2012-0056284 filed on May 25, 2012, Korean Patent Application No. 10-2012-0056285 filed on May 25, 2012, Korean Patent Application No. 10-2012-0056286 filed on May 25, 2012, Korean Patent Application No. 10-2012-0056287 filed on May 25, 2012 and of Korean Patent Application No. 10-2013-0059517 filed on May 27, 2013, the disclosures of which are incorporated herein by reference in their entireties.

TECHNICAL FIELD

The present invention relates to a self-healing hard coating film, and more particularly to a hard coating film that may exhibit self-healing capability together with excellent mechanical properties such as high scratch resistance, chemical resistance, abrasion resistance, and the like, has high strength, and may minimize curl of a film.

BACKGROUND OF THE ART

Recently, with the development of mobile devices such as smartphones, tablet PCs, and the like, thinning and slimming of a substrate for a display is required. As a display window or a front window of the mobile device, glass or tempered glass having excellent mechanical properties is generally used. However, glass causes a high weight of the mobile devices because it is heavy, and may be damaged by external impact.

Thus, plastic resin is being studied as a material for replacing the glass. A plastic resin film is suitable for the tendency to seek lighter mobile devices because it is light-weighted and may not be easily broken. Particularly, to achieve a film having high hardness and abrasion resistance, a film having a hard coating layer on a resin substrate has been suggested.

However, if the thickness of a previously known hard coating film is increased to achieve sufficient surface hardness to replace glass, wrinkles or curls may increase due to cure shrinkage of a hard coating layer, and cracks or peeling of a hard coating layer may be easily generated, and thus optimum properties may not be easily achieved or the field of application is limited.

Further, if the thickness of a hard coating film is made thin with the recent thinning and slimming trend of a substrate for a display, scratch resistance or strength of the hard coating film may not be sufficiently maintained, and thus, optimum properties may not be easily achieved or the field of application is limited.

Recently, studies on self-healing coating materials are actively progressing because they do not require an additional coating or repair process even if a surface is damaged, and they are extremely favorable for appearance of a product and performance maintenance. As a result of these studies, an UV curable composition using self-healing oligomers and a composition to which inorganic particles or fluorinated compounds are added to improve scratch resistance and anti-pollution, and the like have been introduced, but coating materials obtained therefrom may not have sufficient surface hardness and self-healing capability.

Recently, it has been introduced that if a coating material including a polyrotaxane compound is used, a self-healing coating membrane or coating film may be provided, and various methods are being attempted to apply the polyrotaxane compound to coating of automobiles, electronic products, and the like to commercialize it.

For example, WO2005-080469 describes substituting hydroxyl groups of a cyclic molecule α-cyclodextrin with hydroxypropyl groups or at a high substitution rate of methyl groups to improve properties of polyrotaxane.

WO2002-002159 describes crosslinking cyclic molecules (α-cyclodextrin) of polyrotaxane using polyethylene glycol.

WO2007-026578 describes a method for preparing polyrotaxane that can be dissolved in toluene or ethyl acetate by substituting hydroxyl groups of α-cyclodextrin with hydrophobic groups of ε-caprolactone, and WO2010-092948 and WO2007-040262 describe paint including polyrotaxane wherein hydroxyl groups of α-cyclodextrin are substituted by hydrophobic groups of ε-caprolactone.

WO2009-136618 describes polyrotaxane wherein a part or all of the hydroxyl groups of the cyclic molecule α-cyclodextrin are substituted by residues of an organic halogen compound to form a radical polymerization initiation part.

However, coating materials using previously known polyrotaxane compounds do not have sufficient mechanical properties required for a coating material such as scratch resistance, chemical resistance, and abrasion resistance, or do not have sufficient self-healing capability to scratches or external damage, and thus have limitations in commercialization.

PATENT REFERENCE (Patent Reference 0001) WO2005-080469
(Patent Reference 0002) WO2002-002159
(Patent Reference 0003) WO2007-026578
(Patent Reference 0004) WO2010-092948
(Patent Reference 0005) WO2007-040262
(Patent Reference 0006) WO2009-136618

DETAILED DESCRIPTION OF THE INVENTION

Technical Objectives

The present invention provides a hard coating film that may exhibit self-healing capability together with excellent mechanical properties such as high scratch resistance, chemical resistance, abrasion resistance, and the like, has high strength, and may minimize curl of a film.

Technical Solutions

The present invention provides a hard coating film including a hard coating layer including a crosslinked product of: (a) a polyrotaxane compound including a macrocycle to which a lactone-based compound is bonded, wherein a (meth)acrylate-based compound is introduced at the end of the lactone-based compound at a ratio of 40 mol % to 70 mol %, a linear molecule penetrating the macrocycle, and blocking groups arranged at both ends of the linear molecule and preventing the macrocycle from escaping; and (b) a binder resin.

Hereinafter, a hard coating film according to specific embodiments will be explained in detail.

According to one embodiment of the invention, a hard coating film is provided, including a hard coating layer including a crosslinked product of: (a) a polyrotaxane compound including a macrocycle to which a lactone-based compound is bonded, wherein a (meth)acrylate-based compound is introduced at the end of the lactone-based compound at a ratio of 40 mol % to 70 mol %, a linear molecule penetrating the macrocycle, and blocking groups arranged at both ends of the linear molecule and preventing the macrocycle from escaping; and (b) a binder resin.

As the result of studies on a compound that can be used as a self-healing coating material, the inventors confirmed through experiments that if a photocurable coating composition including a polyrotaxane compound having the above specific structure is used, a hard coating film that may exhibit high self-healing capability to a scratch or external damage while achieving excellent mechanical properties such as scratch resistance, chemical resistance, abrasion resistance, and the like, has high strength, and may minimize curl of a film may be provided, and completed the invention.

Specifically, the above-explained hard coating film may be formed through a photocure process of the above-explained photocurable composition, wherein the polyrotaxane compound and the binder resin may form a crosslink, thereby forming a mesh network structure.

Thereby, the hard coating film may have a higher crosslinking degree, thus having high elasticity and elasticity recovery while maintaining high strength or scratch resistance, and the like, thereby achieving high self-healing capability to a scratch or external damage, and minimizing curl when practically applied to a final product.

The polyrotaxane refers to a structurally interlocked compound consisting of a dumbbell shaped molecule and a macrocycle, wherein the dumbbell shaped molecule includes a certain linear molecule and blocking groups arranged at both ends of the linear molecule, the linear molecule penetrates the inside of the macrocycle, and the macrocycle may move along the linear molecule and be prevented from escaping by the blocking groups.

In the polyrotaxane compound, a lactone-based compound is bonded to the macrocycle, wherein a (meth)acrylate-based compound is bonded to the end of the lactone-based compound. A (meth)acrylate-based compound may be introduced at the end of the lactone-based compound.

Particularly, since a double bond that can be used in a crosslinking or polymerization reaction is included at the end of the macrocycle included in the polyrotaxane compound, a hard coating film prepared using a photocurable coating composition including the polyrotaxane compound may be easily bonded or crosslinked with a binder resin while achieving excellent mechanical properties such as scratch resistance, chemical resistance, abrasion resistance, and the like, and thus, may achieve high elasticity or elasticity recovery, achieve excellent self-healing capability to a scratch or external damage, and minimize curl when practically applied to a final product.

In the polyrotaxane compound, the ratio of the (meth)acrylate-based compound introduced at the end of the lactone-based compound may be 40 mol % to 70 mol %, and preferably 45 mol % to 65 mol %.

If the ratio of the (meth)acrylate-based compound introduced at the end of the lactone-based compound is less than 40 mol %, sufficient crosslinking reaction may not occur when preparing a hard coating film according to one embodiment, and thus, the hard coating layer may not have sufficient mechanical properties such as scratch resistance, chemical resistance, abrasion resistance, and the like, hydroxyl functional groups remaining at the end of the lactone-based compound may be increased to increase polarity of the polyrotaxane compound, and compatibility with a non-polar solvent that can be used during a preparation process of the hard coating film may be lowered to deteriorate the quality or appearance of the final product.

Further, if the ratio of the (meth)acrylate-base compound introduced at the end of the lactone-base compound is greater than 70 mol %, the hard coating layer may not have sufficient elasticity or self-healing capability because excessive crosslinking reaction may occur when preparing a hard coating film according to one embodiment, the hard coating film may not have sufficient self-healing capability because the ratio of the (meth)acrylate-based functional groups introduced in the polyrotaxane compound may be increased, and the degree of crosslinking of the hard coating film may be significantly increased to lower elasticity [brittleness may be significantly increased] and lower the stability of the coating liquid during a preparation process of the hard coating film.

As used herein, the term "(meth)acrylate-based compound" is used to commonly designate an acrylate-based compound and a (meth)acrylate-based compound.

The macrocycle may include any macrocycles without specific limitations as long as it has a sufficient size to penetrate or surround the linear molecule, and it may include a functional group such as a hydroxyl, an amino, a carboxyl, a thiol, or an aldehyde group that may react with other polymers or compounds. Specific examples of the macrocycle may include α-cyclodextrin, β-cyclodextrin, γ-cyclodextrin, and a mixture thereof.

The lactone-base compound bonded to the macrocycle may be directly bonded to the macrocycle, or may be bonded by a C1-10 linear or branched oxyalkylene group. The functional group that mediates the bond may be determined according to the kind of the functional group substituted in the macrocycle or the lactone-based compound, or the kind of the compound used in the reaction of the macrocycle and the lactone-based compound.

The lactone-based compound may include a C3-12 lactone-based compound or a polylactone-based compound including C3-12 lactone-based repeat units. Thereby, if the lactone-based compound is bonded to the macrocycle and the (meth)acrylate-based compound, in the polyrotaxane compound, the residue of the lactone-based compound may include a functional group of the following Chemical Formula 1.

[Chemical Formula 1]

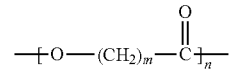

In Chemical Formula 1, m is an integer of from 2 to 11, preferably an integer of from 3 to 7, and n is an integer of from 1 to 20, preferably an integer of from 1 to 10.

At the end of the lactone-based compound that is bonded to the macrocycle, a (meth)acrylate-based compound may be introduced. The "introduction" means a substituted or bonded state.

Specifically, the (meth)acrylate-based compound may be directly bonded to the end of the lactone-based compound, or may be bonded through a urethane bond (—NH—CO—O—), an ether bond (—O—), a thioester bond (—S—CO—O—), or an ester bond (—CO—O—). The kind of the functional group that mediates a bond between the (meth)acrylate-based compound and the lactone-based compound may be determined according to the kind of the functional groups respectively substituted in the (meth)acrylate-based compound and the lactone-based compound, or the kind of the compound used in the reaction of the (meth)acrylate-based compound and the lactone-based compound.

For example, if a (meth)acrylate-based compound including at least one of an isocyanate group, a carboxyl group, a hydroxyl group, a thioate group or a halogen group is reacted with a macrocycle to which a lactone-based compound is bonded, a direct bond, a urethane bond (—NH—CO—O—), an ether bond (—O—), a thioester bond (—S—CO—O—) or an ester bond (—CO—O—) may be formed. Further, if a reaction product of the lactone-based compound-bonded macrocycle with a compound including at least two of an isocyanate group, a carboxyl group, a hydroxyl group, a thioate group, or a halogen group is reacted with a (meth)acrylate-based compound including at least one of a hydroxyl group or a carboxyl group, at least one of a urethane bond (—NH—CO—O—), an ether bond (—O—), a thioester bond (—S—CO—O—), or an ester bond (—CO—O—) may be formed.

The (meth)acrylate-based compound may be a (meth)acryloyl alkyl compound, a (meth)acryloyl cycloalkyl compound or a (meth)acryloyl aryl compound, to which at least one of an isocyanate group, a carboxyl group, a thioate group, a hydroxyl group, or a halogen group is bonded at the end.

Herein, a C1-12 linear or branched alkylene group may be included in the (meth)acryloyl alkyl compound, a C4-20 cycloalkylene group may be included in the (meth)acryloyl cycloalkyl compound, and a C6-20 arylene group may be included in the (meth)acryloyl aryl compound.

Thereby, if the (meth)acrylate-based compound is bonded to the end of the lactone-based compound, in the polyrotaxane compound, the residue of the (meth)acrylate-base compound may include a functional group of the following Chemical Formula 2.

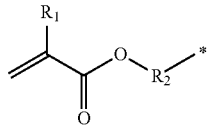

[Chemical Formula 2]

In Chemical Formula 2, $R_1$ is hydrogen or a methyl, and $R_2$ is a C1-12 linear or branched alkylene group, a C4-20 cycloalkylene group, or a C6-20 arylene group. The * denotes a bonding point.

Meanwhile, the liner molecule may include any compound that has a molecular weight over certain level and has a linear shape, but a polyalkylene-based compound or a polylactone-based compound is preferably used. Specifically, a polyoxyalkylene-based compound having a C1-8 oxyalkylene repeating unit or a polylactone-based compound having a C3-10 lactone-based repeat uniting may be used.

Further, the linear molecule may have a weight average molecular weight of 1000 to 50,000. If the weight average molecular weight of the linear molecule is too low, a coating material prepared using the same may not have sufficient mechanical properties or self-healing capability, and if the weight average molecular weight is too high, compatibility of the prepared coating material may be lowered or the appearance or uniformity of the material may be significantly lowered.

Meanwhile, the blocking group may be appropriately controlled according to the property of the prepared polyrotaxane compound, and for example, at least one or two selected from the group consisting of dinitrophenyl, cyclodextrin, adamantane, trityl, fluorescein, and pyrene groups may be used.

The polyrotaxane compound having the above structure may have a weight average molecular weight of 100,000 to 800,000. If the weight average molecular weight of the polyrotaxane compound is too low, a coating material prepared therefrom may not have sufficient mechanical properties or self-healing capability, and if the weight average molecular weight is too high, compatibility of the prepared coating material may be lowered, or the appearance or uniformity of the material may be significantly lowered.

The polyrotaxane compound having the above structure may have a weight average molecular weight of 100,000 to 800,000, preferably 200,000 to 700,000, and more preferably 350,000 to 650,000. If the weight average molecular weight of the polyrotaxane compound is too low, a coating material prepared therefrom may not have sufficient mechanical properties or self-healing capability, and if the weight average molecular weight is too high, compatibility of the prepared coating material may be lowered, or the appearance or uniformity of the material may be significantly lowered.

Further, since the (meth)acrylate-based compound may be introduced at the end of the macrocycle, the polyrotaxane compound may have a relatively low OH value. That is, if only a lactone-based compound is bonded to the macrocycle, multiple hydroxyl (—OH) groups may exist in the polyrotaxane molecule, but as the (meth)acrylate-based compound is introduced at the end of the lactone-based compound, the OH value of the polyrotaxane compound may be lowered.

Meanwhile, the hard coating film may further include a binder resin that forms a crosslinked product with the above-explained polyrotaxane compound.

Specific examples of the binder resin may include a polysiloxane-based resin, a (meth)acrylate-based resin, a urethane (meth)acrylate-based resin, a mixture thereof, or a copolymer thereof, and preferably, a urethane (meth)acrylate-based resin may be used.

The binder resin may have a weight average molecular weight of 20,000 to 800,000, and preferably 50,000 to 700,000. If the weight average molecular weight of the binder resin is too low, the hard coating layer may not have sufficient mechanical properties or self-healing capability. If the weight average molecular weight of the binder resin is too high, the shape or uniformity of the properties of the hard coating layer may be lowered.

The binder resin may be used as a binder resin itself to form the hard coating layer, or it may be formed from a precursor of the binder resin, for example, monomers or oligomers for synthesis of the binder resin.

The precursor of the binder resin, in a photocure process, i.e., if UV or visible rays are irradiated, may form a polymer resin, and it may cause a crosslinking reaction between precursors of the binder resin or a crosslinking reaction with the polyrotaxane compound to form the above-explained crosslinked product.

Specifically, the precursor of the binder resin may include monomers or oligomers including at least one functional group selected from the group consisting of (meth)acrylate, vinyl, siloxane, epoxy, and urethane groups.

Further, one kind of the above-explained monomers or oligomers may be used as the precursor of a binder resin to form a binder resin, or two or more kinds of the monomers or oligomers may be used to form a binder resin.

Specific examples of the monomers including a (meth)acrylate group may include dipentaerythritol hexa(meth)acrylate, pentaerythritol tetra(meth)acrylate, pentaerythritol tri(meth)acrylate, trimethylene propyl tri(meth)acrylate, ethylene glycol di(meth)acrylate, hexanediol di(meth)acrylate, ethyl(meth)acrylate, ethylhexyl(meth)acrylate, butyl(meth)acrylate, hydroxyethyl(meth)acrylate, polycaprolactone modified (meth)acrylate, hydroxyalkyl(meth)acrylate, or a mixture thereof.

Specific examples of the oligomers including a (meth) acrylate group may include a urethane modified acrylate oligomer, an epoxy acrylate oligomer, an etheracrylate oligomer, and the like, including 2 to 10 (meth)acrylate groups. The oligomer may have a weight average molecular weight of 1,000 to 10,000.

Specific examples of the monomers including a vinyl group may include divinyl benzene, styrene, paramethylstyrene, and the like.

Specific examples of the monomers including a urethane group may include urethane acrylate obtained by the reaction of a polyisocyanate and a (meth)acrylate such as polycaprolactone modified (meth)acrylate, hydroxyalkyl(meth)acrylate, and the like.

Meanwhile, the hard coating film may further include inorganic microparticles dispersed in a crosslinked product of the (a) polyrotaxane compound and the (b) binder resin.

The inorganic microparticles may include nanoscaled inorganic particles, for example, nanoparticles with a particle diameter of about 100 nm or less, or about 10 to about 100 nm, or about 10 to about 50 nm. Specific examples of the inorganic microparticles may include silica microparticles, aluminum oxide particles, titanium oxide particles, zinc oxide particles, or a mixture thereof.

As the hard coating film, specifically the hard coating layer including the above-explained inorganic microparticles, hardness of the hard coating film may be further improved.

The hard coating layer may include 1 to 40 wt % of the inorganic microparticles.

The hard coating layer may further include commonly used additives such as a surfactant, an anti-yellowing agent, a leveling agent, an antifoulant, and the like, besides the above-explained inorganic microparticles.

The hard coating layer may have a thickness of 1 to 300 μm.

The hard coating layer may have pencil hardness of 5H or more, 6H or more, or 7H or more under load of 1 kg.

The hard coating layer may further include a polymer resin substrate layer bonded to the hard coating layer. The hard coating film may include the polymer resin substrate layer, and a hard coating layer bonded on one side or both sides of the polymer resin substrate layer.

As the polymer resin substrate layer, a commonly used transparent polymer resin may be used without specific limitations. Specific examples of the polymer resin substrate layer may include a polyester such as polyethylene terephthalate (PET), a cyclic olefin copolymer (COC), a polyacrylate (PAC), a polycarbonate (PC), polyethylene (PE), polymethylmethacrylate (PMMA), polyetheretherketone (PEEK), polyethylene naphthalate (PEN), a polyetherimide (PEI), a polyimide (PI), triacetyl cellulose (TAC), and the like.

The polymer resin substrate layer may be a single layered structure, or if necessary, a multilayered structure including two or more substrates consisting of identical or different materials. Specifically, the polymer resin substrate layer may be a multilayered structure consisting of polyethylene terephthalate (PET), or a structure of two or more layers formed by co-extrusion of polymethylmethacrylate (PMMA)/polycarbonate (PC).

The thickness of the polymer resin substrate layer may be about 5 to about 1200 μm, or about 50 to about 800 μm, but is not limited thereto.

Meanwhile, the hard coating layer may be prepared from a photocurable coating composition including (a) the polyrotaxane compound, (b) the binder resin or a precursor thereof, and a photoinitiator.

Specifically, by irradiating UV or visible rays, for example UV or visible rays of a 200~400 nm wavelength, to the photocurable coating composition, photocuring may occur, and the hard coating film may be provided. The amount of exposure of UV or visible rays is not specifically limited, and for example, 50 to 4000 mJ/cm$^2$ is preferable. The exposure time in the photocuring step is not specifically limited, and it may be appropriately varied according to an exposure device, a wavelength of irradiated rays, or the amount of exposure.

The photocurable coating composition may be coated on a substrate and then photocured. A method for coating the photocurable coating composition is not specifically limited, and for example, bar coating, knife coating, roll coating, blade coating, die coating, micro gravure coating, comma coating, slot die coating, rib coating, and the like may be used.

The substrate that is used for coating the photocurable coating composition is not specifically limited, and the polymer resin substrate of the polymer resin substrate layer that may be bonded to the hard coating layer may be used. By coating the above-explained photocurable coating composition on the polymer resin substrate and photocuring it, the hard coating film according to one embodiment may be provided.

The photocurable coating composition may include a photoinitiator, and as the photoinitiator, any compounds known to be commonly used in the art may be used without specific limitations, and for example, a benzophenone-based compound, an acetophenone-based compound, a biimidazole-based compound, a triazine-based compound, an oxime-based compound, or a mixture thereof may be used.

Specific examples of the photoinitiator may include benzophenone, benzoyl methyl benzoate, acetophenone, 2,4-diethyl thioxanthone, 2-chloro thioxanthone, ethyl anthraquinone, 1-hydroxy-cyclohexyl-phenyl-ketone (as a commercially available product, Irgacure 184 (Ciba Company)), 2-hydroxy-2-methyl-1-phenyl-propan-1-one, and the like.

The photoinitiator may exist on the hard coating film in a trace amount after a photocuring process for preparing the hard coating film.

The photocurable coating composition may further include inorganic microparticles. As explained above, the inorganic microparticles may be used to increase hardness of the prepared hard coating film. Details of the inorganic microparticles are as explained above.

The coating composition may further include an organic solvent. As the organic solvent, those known to be usable in a coating composition may be used without specific limitations.

For example, a ketone-based organic solvent such as methyl isobutyl ketone, methyl ethyl ketone, dimethyl ketone, and the like; an alcohol organic solvent such as isopropyl alcohol, isobutyl alcohol, normal butyl alcohol, and the like; an acetate organic solvent such as ethyl acetate, normal butyl acetate, and the like; and a cellusolve organic solvent such as ethyl cellusolve, butyl cellusolve, and the like may be used, but the organic solvent is not limited thereto.

The amount of the organic solvent may be controlled considering properties of the photocurable coating composition, a coating method, or specific properties of the finally prepared product, and for example, it may be used in an amount of 5 to 500 parts by weight based on 100 parts by weight of the binder resin or a precursor thereof. The organic solvent may be removed through a drying process after the above-explained photocuring process.

Advantageous Effect of the Invention

According to the present invention, a hard coating film may be provided that may achieve excellent mechanical properties such as scratch resistance, chemical resistance, abrasion resistance, and the like, and that has self-healing capability, has high strength, and may minimize curl of the film.

DETAILS FOR PRACTICING THE INVENTION

Hereinafter, the present invention will be explained in detail with reference to the following examples. However, these examples are only to illustrate the invention, and the scope of the invention is not limited thereto.

SYNTHESIS EXAMPLE

Synthesis of Polyrotaxane Polymer

Synthesis Example 1

50 g of a caprolactone-grafted polyrotaxane polymer [A1000, Advanced Soft Material Inc.] was introduced into a reactor, and then 4.53 g of Karenz-AOI [2-acryloylethyl isocyanate, Showadenko K.K.], 20 mg of dibutyltin dilaurate [DBTDL, Merck & Co, Inc.], 110 mg of hydroquinone monomethylene ether, and 315 g of methylethylketone were added thereto and reacted at 70° C. for 5 hours, to obtain a polyrotaxane polymer liquid including cyclodextrin to which a polylactone-based compound having an acrylate-based compound introduced at the end is bonded as a macrocycle (solid content: 15%).

The polyrotaxane polymer liquid was dripped into an n-hexane solvent to precipitate a polymer, which was filtered to obtain a white solid polymer (weight average molecular weight: 500,000).

Figure 1:
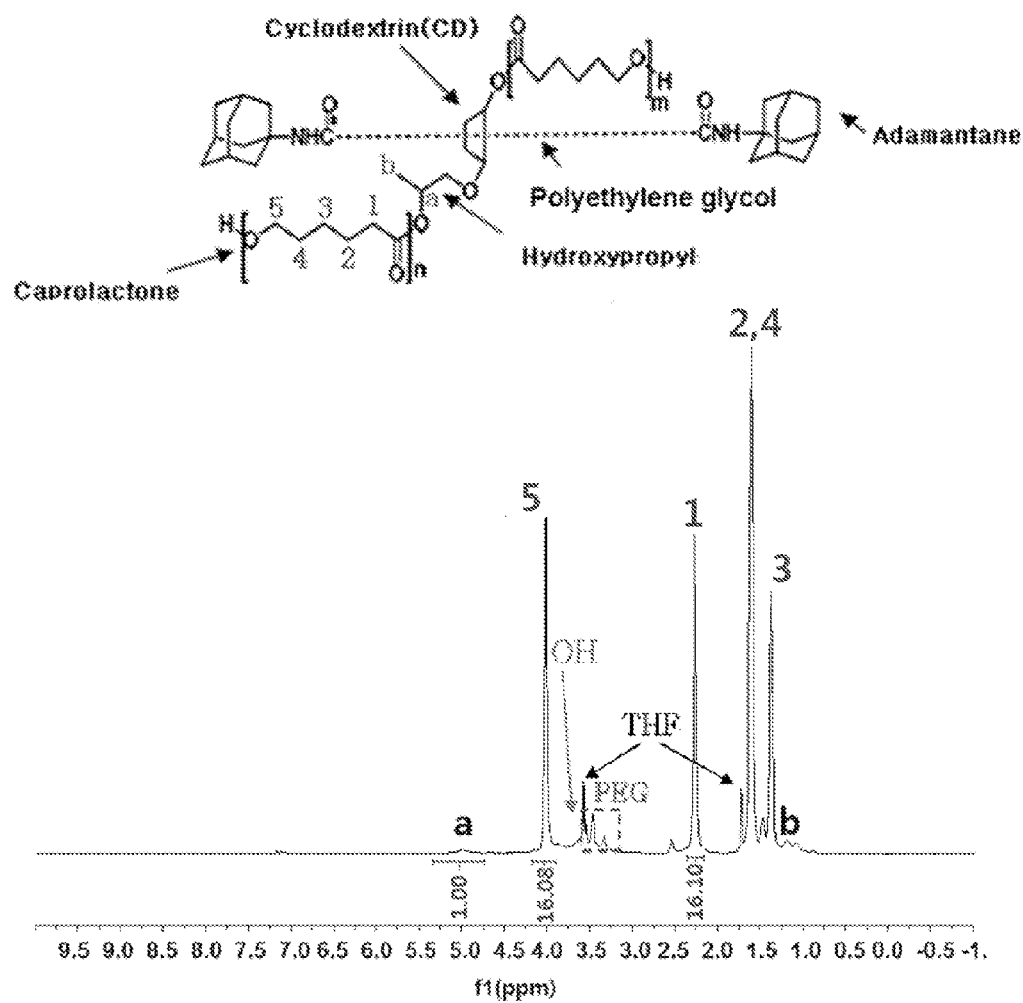
FIG. 1 shows 1H NMR data of a polyrotaxane polymer [A1000] that is used as a reactant in Synthesis Example 1.
Figure 2:
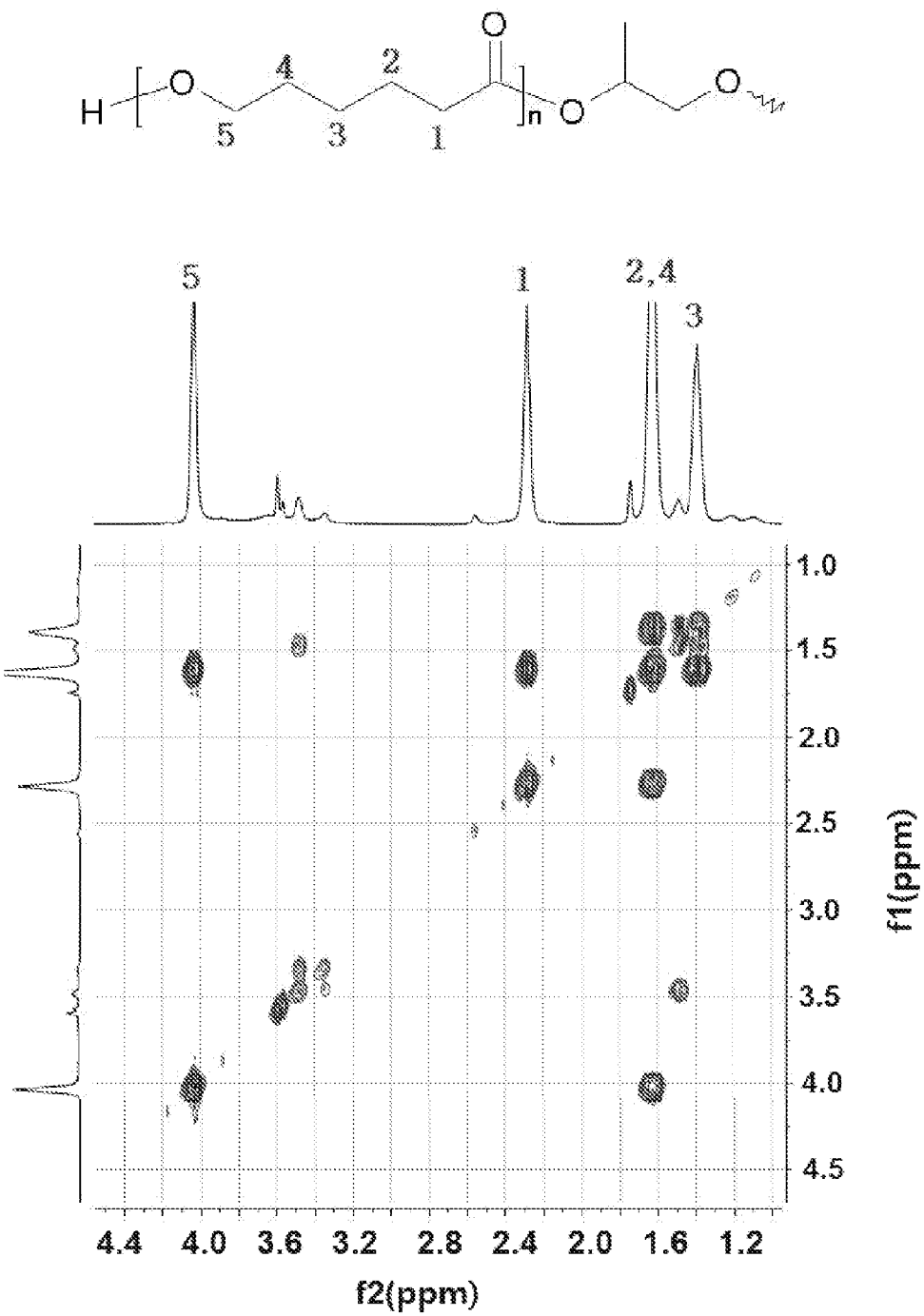
FIG. 2 shows a gCOSY NMR spectrum confirming the structure of caprolactone included in the polyrotaxane polymer [A1000] that is used as a reactant in Synthesis Example 1.

1H NMR data of the polyrotaxane polymer [A1000] that was used as a reactant is shown in FIG. 1, and the structure of the caprolactone bonded to the macrocycle of polyrotaxane was confirmed through the gCOSY NMR spectrum of FIG. 2.

Figure 3:
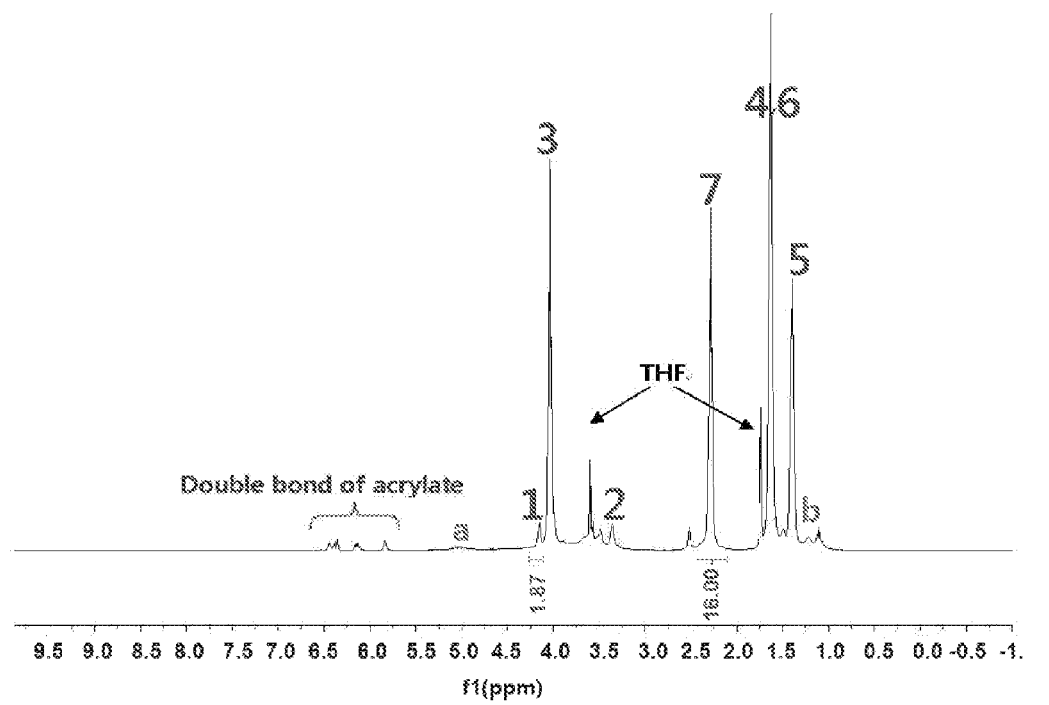
FIG. 3 shows one example of 1H NMR data of polyrotaxane including a macrocycle to which a lactone-based compound including a (meth)acrylate-based compound introduced at the end is bonded.

Further, 1H NMR of polyrotaxane included in the finally obtained polyrotaxane polymer liquid has a shape as shown in FIG. 3 [peak intensity and the like may be different].

The number of caprolactone repeating units in the macrocycle of polyrotaxane (m+n in FIG. 1) was confirmed to be 8.05 through NMR data of FIG. 2, and it can be seen that if the number of repeating units is 8, the $7^{th}$ peak of FIG. 3 has intensity of 16.00 (2H*8).

If the end of the caprolactone repeat unit is 100% substituted by "OH", the $1^{st}$ peak of FIG. 3 relating to acrylate functional groups should be 4.00 (2H*2). Thus, the end substitution rate of a lactone-based compound bonded to the macrocycle of polyrotaxane may be calculated by comparing with practically measured 1H NMR values.

The substitution rate of the finally obtained polyrotaxane polymer liquid (solid content: 15%) was 46.8%.

Synthesis Example 2

50 g of a caprolactone-grafted polyrotaxane polymer [A1000, Advanced Soft Material Inc.] was introduced into a reactor, and then 9.06 g of Karenz-AOI [2-acryloylethyl isocyanate, Showadenko K.K.], 20 mg of dibutyltin dilaurate [DBTDL, Merck & Co, Inc.], 110 mg of hydroquinone monomethylene ether, and 315 g of methylethylketone were added thereto and reacted at 70° C. for 5 hours, to obtain a polyrotaxane polymer liquid including cyclodextrin to which a polylactone-based compound having an acrylate-based compound introduced at the end is bonded as a macrocycle (solid content: 15%).

The polyrotaxane polymer liquid was dripped into an n-hexane solvent to precipitate a polymer, which was filtered to obtain a white solid polymer (weight average molecular weight: 500,000).

1H NMR data of the polyrotaxane polymer [A1000] that was used as a reactant is as shown in FIG. 1, and the structure of the caprolactone bonded to the macrocycle of polyrotaxane was confirmed through the gCOSY NMR spectrum of FIG. 2.

Further, the 1H NMR of polyrotaxane included in the finally obtained polyrotaxane polymer liquid has a shape as shown in FIG. 3 [peak intensity and the like may be different].

The number of caprolactone repeating units in the macrocycle of polyrotaxane (m+n in FIG. 1) was confirmed to be 8.05 through NMR data of FIG. 2, and it can be seen that if the number of repeating units is 8, the $7^{th}$ peak of FIG. 3 has intensity of 16.00 (2H*8).

If the end of the caprolactone repeating units is 100% substituted by "OH", the $1^{st}$ peak of FIG. 3 relating to acrylate functional groups should be 4.00 (2H*2). Thus, the end substitution rate of a lactone-based compound bonded to the macrocycle of polyrotaxane may be calculated by comparing with practically measured 1H NMR values.

The substitution rate of the finally obtained polyrotaxane polymer liquid (solid content: 15%) was 60.0%.

Synthesis Example 3

5 g of a caprolactone-grafted polyrotaxane polymer [A1000, Advanced Soft Material Inc.] was introduced into a 100 ml flask, 1.358 g of 2-isocyanatoethyl acrylate (AOI-VM, Showadenko K.K.), 2 mg of dibutyltin dilaurate [DBTDL, Merck & Co., Inc.], 11 mg of hydroquinone monomethylene ether, and 31.5 g of methylethylketone were added thereto and reacted at 70° C. for 5 hours to obtain a polyrotaxane polymer liquid including cyclodextrin to which a polylactone-based compound having an acrylate-based compound introduced at the end is bonded, as a macrocycle (solid content: 14.79%).

The polyrotaxane polymer liquid was dripped into an n-hexane solvent to precipitate polymer, which was filtered to obtain white solid polymer.

It was confirmed by the same method as Synthesis Examples 1 and 2 that 1H NMR of the polyrotaxane included in the finally obtained polyrotaxane polymer liquid has a shape as shown in FIG. 3 [peak intensity and the like may be different].

As the result of calculating the end substitution rate of the lactone-based compound bonded to the macrocycle of polyrotaxane by the same method as Synthesis Examples 1 and 2, the substitution rate of the finally obtained polyrotaxane polymer liquid (solid content: 15%) was close to about 100%.

EXAMPLES 1 AND 2 AND COMPARATIVE EXAMPLE

Preparation of Photocurable Coating Composition and Hard Coating Film

Example 1

(1) Preparation of Photocurable Coating Composition 100 parts by weight of the polyrotaxane obtained in Synthesis Example 1, 100 parts by weight of dipentaerythritol hexaacrylate, 50 parts by weight of pentaerythritol hexaacrylate, 50 parts by weight of UA-200PA (multifunctional urethane acrylate, Shin-Nakamura Chemical Co., Ltd.) and 10 parts by weight of a photoinitiator Irgacure-184 were mixed with a mixed solvent of methyl ethyl ketone, ethyl acetate, and butyl acetate to a solid content of 50%, to prepare a photocurable coating composition (E1).

(2) Preparation of Hard Coating Film

The obtained photocurable coating composition was coated on a TAC film (thickness 40 μm) using a wire bar (No. 8). The coated product was dried at 90° C. for 2 minutes, and then UV-irradiated for 5 seconds at 200 mJ/cm² to cure. The cured product was heated in an oven of 130° C. to prepare a hard coating film with a thickness of 5 μm.

Example 2

(1) Preparation of Photocurable Coating Composition

A photocurable coating composition (E2) was prepared by the same method as Example 1, except using the polyrotaxane obtained in Synthesis Example 2.

(2) Preparation of Hard Coating Film

A hard coating film was prepared by the same method as Example 1, except using the photocurable coating composition (E2).

COMPARATIVE EXAMPLE (1) Preparation of Photocurable Coating Composition

A photocurable coating composition (CE) was prepared by the same method as Example 1, except using the polyrotaxane obtained in Synthesis Example 3.

(2) Preparation of Hard Coating Film

A hard coating film was prepared by the same method as Example 1, except using the above photocurable coating composition (CE).

EXPERIMENTAL EXAMPLE

Evaluation of Properties of Coating Film

The properties of the coating films obtained in Examples were evaluated as follows.

1. Optical properties: Light transmittance and haze were measured using a haze meter (Murakami Co. Ltd HR-10).

2. Measurement of scratch resistance: A constant load was applied to steel wool to cause scratches while moving it 10 times back and forth, the surface of the coating film was then observed with the naked eye, and a maximum load where a scratch is not generated on the surface of the coating film was measured to evaluate scratch resistance.

3. Measurement of Curl Generation: The above-prepared hard coating film was cut to a size of 10 cm*10 cm, and positioned on a plate glass with the hard coating layer facing upward. The heights of the four edges of the hard coating film from the plate glass were measured, and the average value was considered as an indicator of the curl property.

4. Hardness: Pencil hardness was measured under a load of 500 g.

The measurement results are described in the following Table 1.

TABLE 1

|  | Example 1 | Example 2 | Comparative Example |
|---|---|---|---|
| Transmittance (%)/Haze (%) | 92.3/0.9 | 92.5/0.9 | 92.6/0.2 |
| Pencil hardness | 4 H | 4 H | 3 H |
| Measurement of scratch resistance | 350 gf OK | 400 gf OK | 200 gf OK |
| Curl generation | 2 mm | 2 mm | 10 mm |

As shown in Table 1, it was confirmed that the hard coating films prepared respectively using the compositions of Examples 1 and 2 exhibit low haze while having high transmittance, thus having an excellent appearance property, and do not generate a scratch with steel wool respectively under a load of 350 g and 400 g, thus having excellent scratch resistance.

Particularly, it was also confirmed that the hard coating films respectively obtained using the compositions of Examples 1 and 2 have high scratch resistance compared to the hard coating film obtained in the comparative example, and do not generate a curl because the degree of curling against a flat surface is insignificant, and thus have very low degree of generation of curl or wrinkle due to cure shrinkage compared to the comparative example.

What is claimed is:

1. A hard coated substrate comprising a substrate and a hard coating layer a hard coating layer comprising: a crosslinked product of (a) a polyrotaxane compound comprising a macrocycle to which a lactone-based compound is bonded, wherein a (meth)acrylate-based compound is introduced at the end of the lactone-based compound at a ratio of 40 mol % to 70 mol %, a linear molecule penetrating the macrocycle, and blocking groups arranged at both ends of the linear molecule and preventing the macrocycle from escaping; and (b) a binder resin.

2. The hard coated film according to claim 1,
wherein a ratio of the (meth)acrylate-based compound introduced at the end of the lactone-based compound is 45 mol % to 65 mol %.

3. The hard coated film according to claim 1,
wherein the macrocycle includes at least one selected from the group consisting of α-cyclodextrin, β-cyclodextrin, and γ-cyclodextrin.

4. The hard coated film according to claim 1,
wherein the lactone-based compound is bonded to the macrocycle by a direct bond or a C1-10 linear or branched oxyalkylene group.

5. The hard coated film according to claim 1,
wherein a residue of the lactone-based compound includes a functional group of the following Chemical Formula 1:

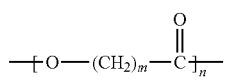
[Chemical Formula 1]

wherein, in Chemical Formula 1, m is an integer of from 2 to 11, and n is an integer of from 1 to 20.

6. The hard coated film according to claim 1, wherein the (meth)acrylate-based compound is bonded to the residue of the lactone-based compound through a direct bond, a urethane bond, an ether bond, a thioester bond, or an ester bond.

7. The hard coated film according to claim 1, wherein the residue of the (meth)acrylate-based compound includes a functional group of the following Chemical Formula 2:

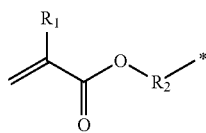
[Chemical Formula 2]

wherein, in Chemical Formula 2, $R_1$ is hydrogen or a methyl, and $R_2$ is a C1-12 linear or branched alkylene group, a C4-20 cycloalkylene group, or a C6-20 arylene group.

8. The hard coated film according to claim 1, wherein the linear molecule is a polyoxyalkylene-based compound or a polylactone-based compound.

9. The hard coated film according to claim 1, wherein the linear molecule has a weight average molecular weight of 1000 to 50,000.

10. The hard coated film according to claim 1, wherein the blocking group includes at least one functional group selected from the group consisting of dinitrophenyl, cyclodextrin, adamantane, trityl, fluorescein, and pyrene groups.

11. The hard coated film according to claim 1, wherein the polyrotaxane compound has a weight average molecular weight of 100,000 to 800,000.

12. The hard coated film according to claim 1, wherein the binder resin is selected from the group consisting of a polysiloxane-based resin, a (meth)acrylate-based resin, and a urethane (meth)acrylate-based resin, a mixture thereof, and a copolymer thereof.

13. The hard coated film according to claim 1, wherein the hard coating layer has pencil hardness of 5H or more under a load of 1 kg.

14. The hard coated film according to claim 1, further comprising inorganic microparticles dispersed in a crosslinked product of the (a) polyrotaxane compound and the (b) binder resin.

15. The hard coated film according to claim 1, wherein the hard coating layer has a thickness of 1 to 300 µm.

16. The hard coated film according to claim 1, wherein the substrate is a polymer resin substrate.

* * * * *